United States Patent [19]

Coffin et al.

[11] 4,182,990
[45] Jan. 8, 1980

[54] RADAR RECEIVER AND METHOD OF INDICATING RANGE TO A RADAR SOURCE

[75] Inventors: Calvin B. Coffin; Richard M. Christmann, both of Wichita, Kans.

[73] Assignee: Interstate Electronics Supply, Inc., Wichita, Kans.

[21] Appl. No.: 907,510

[22] Filed: May 19, 1978

[51] Int. Cl.² .............................................. H04B 1/16
[52] U.S. Cl. ................................. 325/364; 340/552; 340/691; 343/18 E; 343/112 D
[58] Field of Search ................ 325/67, 338, 340, 341, 325/363, 364; 343/5 PD, 18 E, 112 D, 113 PT; 340/181, 567, 600, 552, 540, 660, 691

[56] References Cited

U.S. PATENT DOCUMENTS

| | | | |
|---|---|---|---|
| 2,545,503 | 3/1951 | Tucker | 325/364 |
| 3,366,958 | 1/1968 | Seaborn | 343/112 D |
| 3,389,392 | 6/1968 | Stauffer et al. | 325/364 |
| 3,636,641 | 1/1972 | Daskam | 325/364 |
| 3,660,844 | 5/1972 | Potter | 325/363 |
| 3,717,858 | 2/1973 | Hadden | 340/181 |
| 3,965,425 | 6/1976 | Peterson et al. | 325/364 |

Primary Examiner—Marc E. Bookbinder
Attorney, Agent, or Firm—Fishburn, Gold and Litman

[57] ABSTRACT

A radar receiver for indicating the presence of a source of microwave energy includes an antenna, a modulation oscillator and modulator diode, a detector diode connected to bandpass amplifier stages, a peak detector providing a signal proportional in level to the received microwave energy signal strength, and a voltage controlled oscillator (VCO) connected to the peak detector and having a frequency in proportion to the peak detector signal level, the frequency of the VCO being an indication of range from a source of radar and a change in frequency being an indication of a rate of approach thereto. The VCO controls a transistor switch, and alarm output devices are connected through the transistor with alarm power sources, whereby an alarm signal activates the output device at a frequency related to the microwave signal strength. A comparator is connected in parallel to the VCO and triggers in response to a selected level of the peak detector signal to provide a steady level signal which closes the transistor switch and effects a steady alarm to indicate a selected range from the radar source.

14 Claims, 3 Drawing Figures

RADAR RECEIVER AND METHOD OF INDICATING RANGE TO A RADAR SOURCE

The present invention relates to microwave receivers and more particularly to such a receiver which provides an alarm signal giving relative information concerning proximity to a source of microwave energy.

Small self-contained microwave receivers have a number of applications: in certain military situations, in measuring leakage from equipment such as microwave ovens, in measuring ambient levels of microwave energy around radar and microwave communication installations, and, increasingly in recent years, by truck drivers and motorists to sense speed measurement radar equipment.

There are many such radar detectors available. A common problem with such devices is a susceptibility to false alarms because of high noise levels existing at microwave frequencies combined with high sensitivities necessary in the receivers. In order to diminish the false alarm occurrence, the sensitivity is sometimes decreased to the point at which a vehicle with such a detector is within range for a speed measurement before the radar detector sounds an alarm.

Another area of deficiency in such radar detectors is in the presentation of useful information to the user. While the mere sounding of an alarm is useful to an extent, greater use can be made of an indication of the range to the radar source. One method of indicating relative range is to control the tone on a voltage controlled oscillator whereby rising pitch indicates motion toward the source, for example. However, a tone with a steadily rising pitch is likely to be disturbing to some people; and, further, while most people can perceive a change in pitch, many would not be able to relate a given pitch to its corresponding range.

In contrast to prior radar detector receivers, the present invention employs a low audio frequency VCO to modulate or gate a tone signal. The frequency of the VCO is low enough that the alarm signal is discernable as a repetitive "beep", varying in repetition rate according to the range. It is relatively easy for most people to instantly identify a beep rate as slow or fast and to be able to relate the beep rate to a source that is distant or close. In addition, a comparator is provided which triggers a steady tone to indicate position within a range from the source, for example, one at which the speed of a vehicle can be measured. Further, a gain control is included which may be adjusted according to the noise level of a given area to minimize false alarms or to vary reception range.

The principal objects of the present invention are: to provide a method of indicating range to a radar source by a variable rate beep or flash; to provide a radar receiver employing such a method; to provide such a receiver which displays a steady tone indicating a predetermined range to a radar source; to provide such a receiver which is less susceptible to false alarms than prior receivers; to provide such a receiver having an adjustable gain to compensate for varying levels of microwave noise or to vary reception range; to provide such a receiver wherein a variety of alarm output devices may be employed; to provide such a receiver which may be tested for operability by the user with relative ease; to provide such a receiver wherein the antenna may be enclosed in a separately moutable housing; and to provide such a radar receiver which is economical to manufacture, positive in operation, durable in use, and which is particularly well adapted for its intended purpose.

Other objects and advantages of this invention will become apparent from the following description taken in connection with the accompanying drawings wherein are set forth, by way of illustration and example, certain embodiments of this invention.

The drawings constitute a part of the specification, include an exemplary embodiment of the present invention, and illustrate various objects and features of the radar receiver.

FIG. 3 is a block diagram of an arrangement for enclosing portions of the radar receiver in separate housings.

Figure 1:
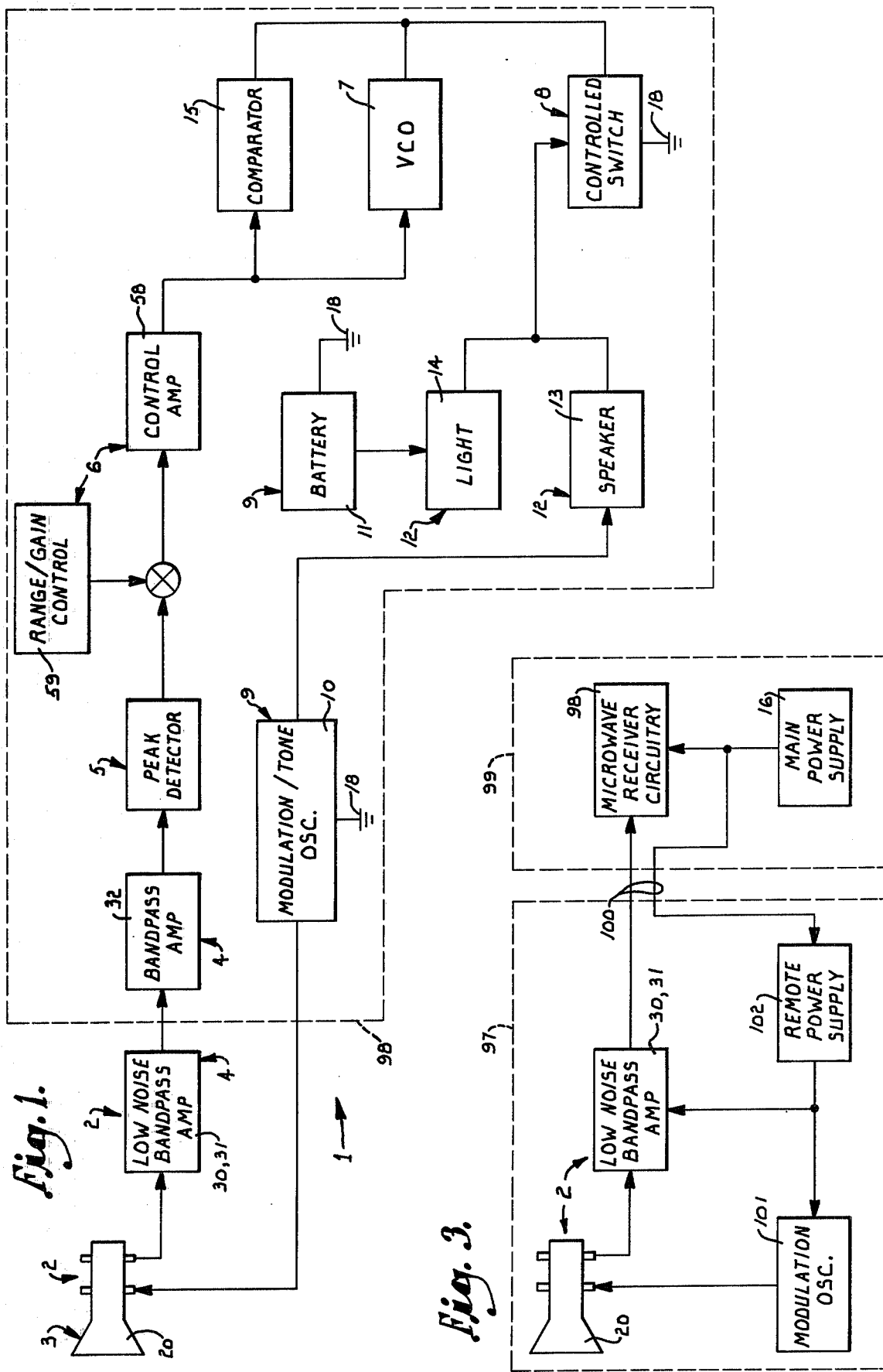
FIG. 1 is a block diagram of the radar receiver.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring to the drawings in more detail:

The reference numeral 1 generally designates a microwave receiver for use particularly to indicate the presence of speed detection radar. The receiver 1 includes front end means 2 including antenna means 3 and amplifier means 4 connected to the antenna means, peak detector means 5 connected to the amplifier means, and threshold means 6 connected to the peak detector means and controlling the frequency of a voltage controlled oscillator (VCO) 7, whereby the frequency thereof is an indication of range from a source of radar to the receiver. The VCO 7 is connected to a controlled switch means or transistor 8 which controls the transfer of power from alarm power sources 9, such as a tone oscillator 10 or a battery 11, to alarm output devices 12, such as a speaker 13 or a lamp 14 respectively. The receiver 1 preferably includes a comparator 15 connected generally in parallel with the VCO 7 and operative to trigger a continuous alarm in response to microwave signal strength in excess of a selected level.

The receiver includes a regulated power supply 16 having the battery 11, which is preferably the battery of the vehicle (not shown) in which the receiver is installed, connected thereto. The power supply 16 includes a V+ power output terminal 17, to which the V+ terminals of FIG. 2 are connected, and a power ground 18.

The receiver 1 may be constructed using discrete components; however, with the availability of economical, high quality integrated circuits, the preferred receiver is constructed using integrated operational amplifiers. In FIG. 2, power supply connections to the op amps are generally omitted since these may easily be determined from the specifications of the particular components employed.

The receiver 1 is primarily intended for reception of continuous wave radar in the X-band (10 GHz) and the K-band (24 GHz). Therefore, the antenna means 2 includes an antenna 20, preferably, responsive only to X and K band signals. The antenna 20 includes a modulator diode 21 mounted thereon and connected to a modulation oscillator. In the preferred receiver 1, the tone oscillator 10 serves the dual function of providing a tone signal for the alarm and providing a modulation signal to the modulator diode 21. The modulator diode 21 functions to gate microwave energy received by the antenna to a detector diode 22 also mounted on the antenna 20. The detector diode 22 develops an electrical signal comprising an AC signal at the modulation frequency, chosen at about one kilohertz, riding on a DC bias level provided by resistors 23 and 24. A capacitor 25 decouples AC components, as from the power supply 16, from the detector diode 22.

Figure 2:
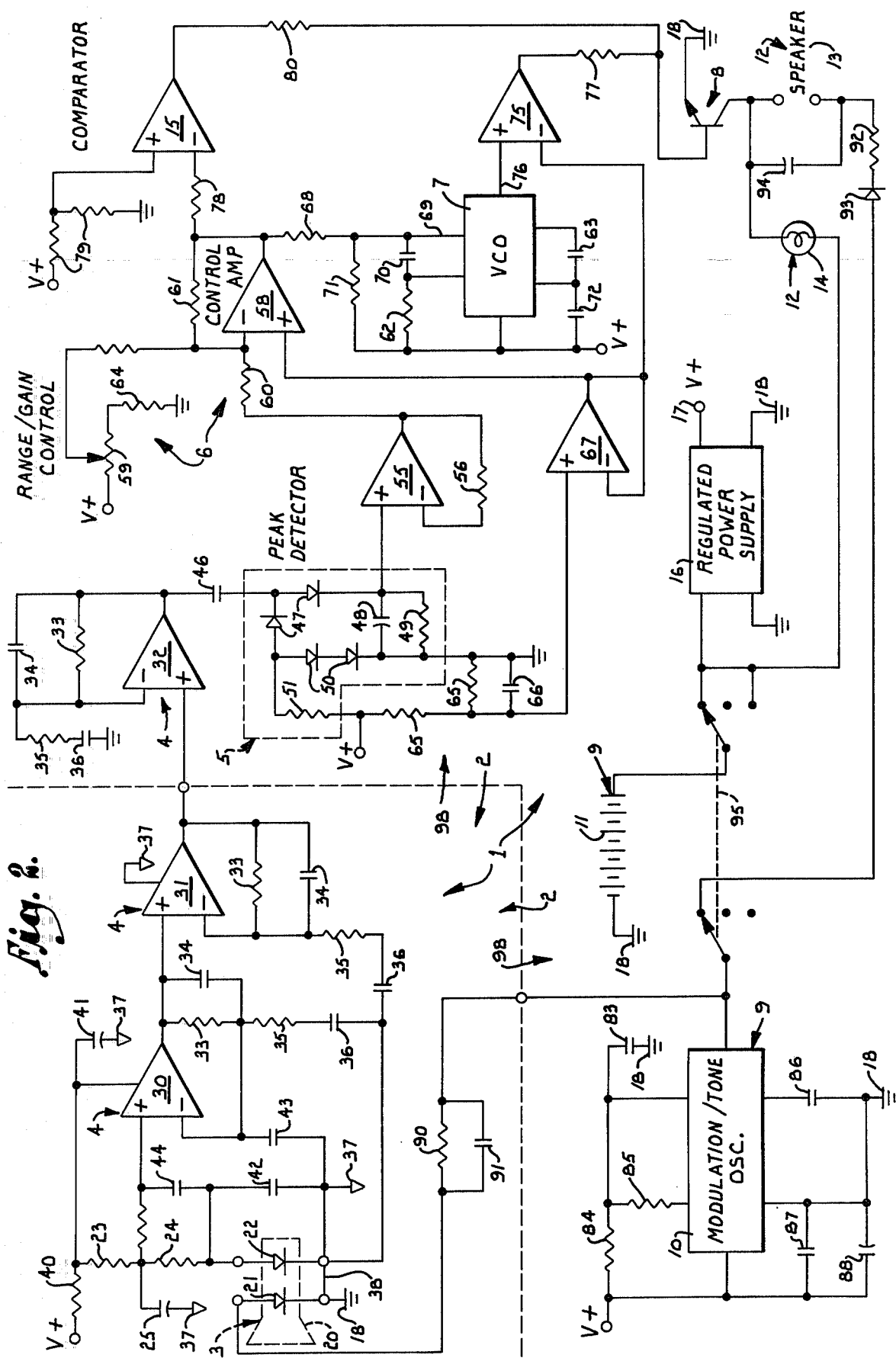
FIG. 2 is a schematic and block diagram of the radar receiver.

Referring to FIG. 2, the amplifier means 4 includes two low noise bandpass amplifier stages 30 and 31 and a conventional bandpass stage 32. Amplifiers 30, 31, and 32 are connected in non-inverting, unity DC gain, AC feedback configurations. This eliminates the effect of DC variables and drift while providing a relatively high degree of controlled AC gain. The bandpass characteristics of amplifiers 30, 31, and 32 are centered around the modulation frequency of one kilohertz and are determined for each amplifier by a feedback resistor 33 and capacitor 34, which determine the high pass characteristics, and by a resistor 35 and capacitor 36, which determine the low pass characteristics. The specific values of the bandpass elements 33, 34, 35, and 36 may be determined by conventional methods according to the specific components used for amplifiers 30, 31, and 32.

Amplifiers 30 and 31 include connections to a low noise ground 37, isolated in the front end 2 of the receiver from the power ground 18, to avoid ground loops and ground noise which can be a problem because of the low signal level, on the order of one half microvolt across the detector diode 22. The low noise ground 37 is connected to the power ground 18 at the detector diode 22 by a conductor 38. Resistor 40 and capacitor 41 provide power supply AC decoupling. Capacitors 42 and 43 suppress undesired high frequency AC components.

The one kHz AC signal from the detector diode 22 is applied to amplifier 30 by a coupling capacitor 44. Amplifiers 30 and 31 provide 70 to 80 decibels of gain to the detector diode signal. Amplifier 32 includes connections to the power ground 18 since prior to entering amplifier 32, the signal-to-noise ratio has been substantially increased. Amplifier 32 provides an additional 30 to 40 decibels of gain to the one kHz signal.

Amplifier 32 is coupled to peak detector means 5 by a capacitor 46. Peak detector means 5 includes peak detector diodes 47, and a capacitor 48 and resistor 49 form a charge storage and time constant network. The diodes 47 are biased in a threshold conducting state by a pair of diodes 50 and a bias resistor 51. The output of peak detector means 5 is a DC level proportional to the peak voltage of the AC output from amplifier 32. As the AC output of amplifier 32 changes, corresponding to a change in received microwave signal strength, the DC level out of the peak detector 5 changes proportionally.

The DC peak detector output or peak signal is applied to the input of an amplifier 55 connected as a temperature compensated voltage follower including a feedback resistor 56. Amplifier 55 is operative to counteract the effects of temperature changes which might otherwise result in false alarms or failure to detect a source of radar.

The output of amplifier 55 is connected to the threshold means 6 including a control amplifier 58 and a range/gain control 59 by a coupling resistor 60. The control amplifier 58 is an inverting unity gain stage, the gain being determined by a feedback resistor 61. The output of control amplifier 58 determines the frequency of the VCO 7 for a given level of the output of the peak detector 5 in conjunction with a timing resistor 62 and capacitor 63 connected to the VCO 7. The least sensitive threshold setting of the range/gain control 59 is determined by a resistor 64 connected in series therewith. Resistors 65 form a voltage divider network, bypassed by a capacitor 66, which provides operating point bias for control amplifier 58 through an amplifier 67 connected as a voltage follower.

A resistor 68 couples the output of control amplifier 58 to the frequency control input 69 of the VCO, and the value of resistor 68 is preferably chosen so that the frequency control range of amplifier 58 is sufficiently broad for the expected peak detector signal level variation. A capacitor 70, connected to the VCO 7, minimizes unwanted frequency modulation of the VCO. Resistor 71 references the VCO to the power supply 16, while capacitor 72 is a power supply bypass capacitor. Amplifier 75 is a ground referenced level translator connected to the output 76 of the VCO 7. The bias point of amplifier 75 is set by voltage follower 67. The output of amplifier 75 is connected to the base of the transistor 8 through a resistor 77.

The comparator 15 has an input connected to the output of the control amplifier 58 through a resistor 78. The comparator 15 is operative to trigger a steady level output signal in response to the input level thereto exceeding a selected value. The point at which comparator 15 triggers is set by a voltage divider formed by resistors 79. The comparator 15 is connected to the base of transistor 8 through a resistor 80.

The pitch of the modulation/tone oscillator 10 is determined by a capacitor 83 and resistors 84 and 85. Resistor 85 may be a variable resistor for precise frequency determination. Capacitor 86 serves as a bypass for supression of internal noise in the oscillator 10. Capacitor 87 is a power supply bypass capacitor, while capacitor 88 is a filter capacitor associated with the power supply 16.

In the preferred embodiment, oscillator 10 provides a modulation signal as well as a tone signal. Resistor 90 is a current limiting resistor to provide proper forward bias current to the modulator diode 21. Certain modulator diodes may require a momentary negative voltage in order to clear properly between each cycle. Capacitor 91 in parallel with resistor 90 provides that voltage.

The transistor 8 acts as a switch to complete circuits, each containing an alarm power source 9 and an alarm output device 12, to the ground 18. Whenever the output of either the comparator 15 or the VCO 7 through amplifier 75 is high, conduction between the switch terminals or the collector and emitter of transistor 8 will be effected. During such condution, either a tone signal from the oscillator 10 will be conducted through the speaker 13 through resistor 92 and diode 93 and buffered by capacitor 94, or current will be conducted through the lamp 14 from the battery 11. A switch 95 is operative to connect both the oscillator 9 and battery 11 to the respective output device, in the position shown in FIG. 2, or to disconnect the oscillator 9 from the speaker 13 in the lower position of the switch 95. The middle position of switch 95 is an OFF position and disconnects the battery 11 from the receiver 1.

The receiver 1 illustrated schematically in FIGS. 1 and 2 is primarily intended for mounting in a single housing (not shown) including the antenna 20. For this reason, the receiver 1 is most often mounted on top of the dashboard of a vehicle, facing forward toward the windshield. In such a position, the receiver 1 is highly visible and, therefore, might likely invite theft thereof. In order to diminish the likelihood of theft, the receiver 1 may be mounted in such a way as to be less obvious. With reference to FIG. 3, the antenna 1 and the receiver front end 2 may be mounted in one housing 97 for mounting externally, while the remaining circuitry 98 is mounted in a main housing 99 for installation under the dash of the vehicle. The external or remote housing 97 may be made weatherproof and disguised, for example, as a fog light housing, and mounted on the vehicle bumper. A cable 100 extends from the remote housing 97 to the main housing 99.

When the receiver 1 is mounted in two housings, a separate modulation oscillator 101 is employed, and the oscillator 10 is employed as a tone oscillator only. The modulation oscillator 101 and the low noise amplifiers 30 and 31 are installed in the remote housing 97 along with the antenna 20 and a remote regulated power supply 102. The power supply 102 receives power from the main power supply 16 and supplies regulated power to the modulation oscillator 101 and the low noise amplifiers 30 and 31.

Normally, police speed detection radar has a range of about 1500 feet. With a suitable antenna, the receiver 1 of the present invention can detect the presence of such radar at a maximum range of about three miles depending on terrain, weather, local microwave noise, and the absence of intervening structures. The alarm signal begins as a slow intermittent beep or flash. As the radar source is approached, the repetition rate increases. At about 1650 feet, about ten percent greater than the speed detection range, the beep or flash ceases and is replaced by a steady tone or illumination of the lamp, indicating that a range has been reached at which a speed measurement can be made.

In use, the radar receiver 1 is mounted with the antenna 20 facing forward. The switch 95 is moved from the OFF position to either the beep/flash position, to activate both the speaker 13 and the lamp 14, or to the flash only position. To set for maximum range, the range/gain control 59 is turned up until an alarm is observed. The control 59 is then decreased slightly to a point just below a position at which an alarm is emitted.

While certain forms of the present invention have been described and illustrated, it is not to be limited thereto except insofar as such limitations are included in the following claims.

What is claimed and desired to secure by Letters Patent is:

1. In a microwave receiver having front end means providing an amplified signal proportional in level to the strength of received microwave energy, the improvement comprising:
   (a) peak detector means connected to said front end means and having an output providing a DC peak signal proportional in level to said amplified signal;
   (b) a voltage controlled oscillator (VCO) having a frequency control input connected to said peak detector means output, the frequency of a VCO signal from an output of said VCO being determined by the level of said peak signal;
   (c) an alarm power source;
   (d) an alarm output device; and
   (e) controlled switch means having a control terminal connected to the output of said VCO and having a pair of switch terminals, said alarm power source being connected to one of said switch terminals, said alarm output device being connected to the other of said switch terminals, said VCO effecting periodic conduction between said switch terminals, and said alarm power source transferring activating power to said alarm output device during said conduction between said switch terminals.

2. A microwave receiver as set forth in claim 1 including: a comparator having an input connected to the output of said peak detector means and having an output connected to said controlled switch means control terminal, said peak signal triggering a steady level signal from the output of said comparator upon being in excess of a selected level, said steady level signal effecting continuous conduction between said switch terminals.

3. A microwave receiver as set forth in claim 1 wherein:
   (a) said alarm power source is a battery; and
   (b) said alarm output device is a lamp, said lamp emitting light during said conduction between said switch terminals.

4. A microwave receiver as set forth in claim 1 wherein:
   (a) said alarm power source is a tone oscillator producing a tone signal; and
   (b) said alarm output device is a speaker, said speaker receiving said tone signal during said conduction between said switch terminals.

5. A microwave receiver as set forth in claim 1 wherein said receiver includes a modulator diode mounted in antenna means and a modulation oscillator connected to said modulator diode and providing an audio frequency signal thereto and wherein:
   (a) said alarm power source comprises said modulation oscillator; and
   (b) said alarm output device is a speaker, said speaker receiving said audio frequency signal during said conduction between said switch terminals.

6. A microwave receiver as set forth in claim 1 including: threshold means interposed between the output of said peak detector means and the frequency control input of said VCO, said threshold means being operative to establish a selected relationship between the frequency of said VCO signal and the level of said peak signal.

7. A microwave receiver as set forth in claim 6 including: a comparator having an input connected to said threshold means and an output connected to said controlled switch means control terminal, said threshold means effecting triggering of said comparator for a selected level of said peak signal, said comparator having a steady level signal at the output thereof upon said triggering, and said steady level signal effecting continuous conduction between said switch terminals.

8. A microwave receiver as set forth in claim 6 wherein said threshold means includes:
   (a) a control amplifier having an input connected to the output of said peak detector means and having an output connected to the frequency control input of said VCO; and (b) said control amplifier having a gain chosen to determine a selected relationship between the level of said peak signal and the frequency of said VCO signal.

9. A microwave receiver as set forth in claim 8 including: a gain control connected to said control amplifier, said gain control being selectively adjustable to change the frequency of said VCO signal for a given level of said peak signal and to change the sensitivity of said receiver.

10. A microwave receiver as set forth in claim 1 wherein said front end means includes antenna means and amplifier means, and including:
 (a) a main housing mounting said VCO, said controlled switch means, said alarm power source, and said alarm output device;
 (b) a main power supply mounted in said main housing and supplying operating power for said microwave receiver;
 (c) a remote housing mounting said front end means; and
 (d) a remote power supply mounted in said remote housing, receiving power from said main power supply, and supplying regulated operating power for said front end means.

11. In a microwave receiver including antenna means, a modulation oscillator connected to a modulator diode, a detector diode, and amplifier means connected to said detector diode and providing an amplified signal proportional in level to the strength of microwave energy received by said antenna means, the improvement comprising:
 (a) peak detector means connected to said amplifier means and having an output providing a peak signal proportional in level to said amplified signal;
 (b) control amplifier means having an input connected to the output of said peak detector means and having an output providing a control signal, said control amplifier means having a gain whereby said control signal bears a selected proportional relationship to said peak signal;
 (c) a voltage controlled oscillator (VCO) having a frequency control input connected to the output of said control amplifier means and having an output providing a VCO signal having a frequency determined by the level of said control signal;
 (d) a comparator having an input connected to the output of said control amplifier means, said comparator providing a steady level signal at an output thereof in response to said control signal exceeding a selected level;
 (e) an alarm power source;
 (f) an alarm output device; and
 (g) controlled switch means having a control terminal connected to the outputs of said VCO and said comparator and having a pair of switch terminals, said alarm power source being connected to one of said switch terminals, said alarm output device being connected to the other of said switch terminals, said VCO signal effecting periodic conduction between said switch terminals, said steady level signal effecting continuous conduction between said switch terminals, said continuous conduction overriding said periodic conduction, and said alarm power source transferring activating power to said alarm output device during said conduction between said switch terminals.

12. A microwave receiver as set forth in claim 11 wherein:
 (a) said alarm power source is a tone oscillator producing a tone signal; and
 (b) said alarm output device is a speaker, said speaker receiving said tone signal during said conduction between said switch terminals.

13. A method of indicating the presence of an active source of microwave energy of selected frequencies and indicating the range therefrom and the rate of approach thereto, said method comprising:
 (a) receiving said microwave energy;
 (b) deriving a peak signal proportional in level to the strength of said microwave energy;
 (c) generating a periodic signal having a frequency determined by the level of said peak signal, the relative frequency of said periodic signal being an indication of said range and a relative change in said frequency being an indication of said rate of approach;
 (d) providing an alarm power source and an alarm output device; and
 (e) controlling the transfer of power from said alarm power source to said alarm output device by means of said periodic signal whereby said alarm output device is activated at the frequency of said periodic signal.

14. A method as set forth in claim 13 including:
 (a) triggering a steady level signal in response to a selected level of said peak signal, said selected level representing a selected proximity to said source; and
 (b) controlling the transfer of power from said alarm power source to said alarm output device by means of said steady level signal whereby said alarm output device is activated continuously in response to said steady level signal.

* * * * *